United States Patent
Bhogal et al.

(10) Patent No.: US 10,452,620 B2
(45) Date of Patent: Oct. 22, 2019

(54) AUTOMATIC FILE VERSION VERIFICATION WITHIN ELECTRONIC MAIL

(75) Inventors: Kulvir S. Bhogal, Pflugerville, TX (US); Michael C. Hollinger, Round Rock, TX (US); Jennifer E. King, Austin, TX (US); Christina K. Lauridsen, Austin, TX (US); Robert R. Peterson, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1231 days.

(21) Appl. No.: 13/249,476

(22) Filed: Sep. 30, 2011

(65) Prior Publication Data

US 2013/0086001 A1  Apr. 4, 2013

(51) Int. Cl.
*G06F 16/178* (2019.01)

(52) U.S. Cl.
CPC .............................. *G06F 16/1787* (2019.01)

(58) Field of Classification Search
CPC ................................................ G06F 17/30176
USPC .............................................................. 707/689
See application file for complete search history.

(56) References Cited

U.S. PATENT DOCUMENTS

| | | | |
|---|---|---|---|
| 5,758,342 A * | 5/1998 | Gregerson | ................... 707/758 |
| 6,549,916 B1 | 4/2003 | Sedlar | |
| 6,959,331 B1 * | 10/2005 | Traversat | .............. G06F 9/4416 |
| | | | 709/222 |
| 7,209,953 B2 | 4/2007 | Brooks | |
| 7,478,132 B2 | 1/2009 | Chen et al. | |
| 7,590,640 B2 | 9/2009 | Wolber et al. | |
| 7,606,840 B2 | 10/2009 | Malik | |
| 7,933,870 B1 * | 4/2011 | Webster | ................ G06F 16/178 |
| | | | 707/638 |
| 8,121,990 B1 * | 2/2012 | Chapweske et al. | .......... 707/695 |
| 8,375,290 B1 * | 2/2013 | Chan | ................. G06F 17/30011 |
| | | | 713/156 |
| 9,600,679 B2 * | 3/2017 | Calero | ................ G06F 21/6218 |
| 2004/0064733 A1 * | 4/2004 | Gong | ............................ 713/201 |
| 2005/0097441 A1 * | 5/2005 | Herbach et al. | ........... 715/501.1 |
| 2006/0136360 A1 * | 6/2006 | Gebhart | .............. G06F 11/3476 |
| 2007/0143425 A1 | 6/2007 | Kieselbach et al. | |
| 2007/0192324 A1 * | 8/2007 | Pedersen | ........... G06F 17/30902 |
| 2007/0299888 A1 * | 12/2007 | Thornton | ................ G06F 16/51 |
| 2008/0154905 A1 * | 6/2008 | Paalasmaa | .......... G06F 16/9577 |
| 2008/0177755 A1 | 7/2008 | Stern et al. | |
| 2008/0208934 A1 | 8/2008 | Demsky et al. | |
| 2011/0016181 A1 | 1/2011 | Malik et al. | |

(Continued)

OTHER PUBLICATIONS

"Confluence 3.5x" [online] Atlassian Pty Ltd. 2011 [retrieved Jul. 15, 2011] <http://confluence.atlassian.com/display/DOC/Attachment+Versions>.

*Primary Examiner* — Cam Linh T Nguyen
(74) *Attorney, Agent, or Firm* — Cuenot, Forsythe & Kim, LLC

(57) ABSTRACT

A method can include determining metadata for a file responsive to initiating an operation on the file stored within a client system and determining a storage location within a file repository of a master version of the file from the metadata. The method also can include determining, from the storage location, whether the master version of the file is more recent than the file stored within the client system using a processor of the client system.

18 Claims, 2 Drawing Sheets

(56) References Cited

U.S. PATENT DOCUMENTS

2011/0029623 A1 2/2011 Ax et al.
2011/0029625 A1 2/2011 Cheng et al.

* cited by examiner

AUTOMATIC FILE VERSION VERIFICATION WITHIN ELECTRONIC MAIL

BACKGROUND

One or more embodiments disclosed within this specification relate to file version verification within a computing system. Electronic files, e.g., documents, are routinely exchanged and edited among different users through a variety of different communication mechanisms. Typically, each user makes a local copy or version of the file for individual use. In some cases, a newer version of the electronic file can become available, rendering the local copy of the electronic file outdated or potentially obsolete. The outdated electronic file may be inadvertently or unknowingly propagated to other users.

BRIEF SUMMARY

One or more embodiments disclosed within this specification relate to file version verification within a computing system and, more particularly, to automatic file version verification.

An embodiment can include a method. The method can include determining metadata for a file responsive to initiating an operation on the file stored within a client system and determining a storage location within a file repository of a master version of the file from the metadata. The method also can include determining, from the storage location, whether the master version of the file is more recent than the file stored within the client system using a processor of the client system.

Another embodiment can include a system. The system can include a computer readable storage medium having computer readable program code embodied therewith and a processor coupled to the computer readable storage medium. Responsive to executing the computer readable program code, the processor can be configured to perform the various functions and/or operations described within this specification.

Another embodiment can include a computer program product. The computer program product can include a computer readable storage medium having computer readable program code embodied therewith. The computer readable program code can include computer readable program code configured for implementing the various functions and/or operations described within this specification.

DETAILED DESCRIPTION

Figure 1:
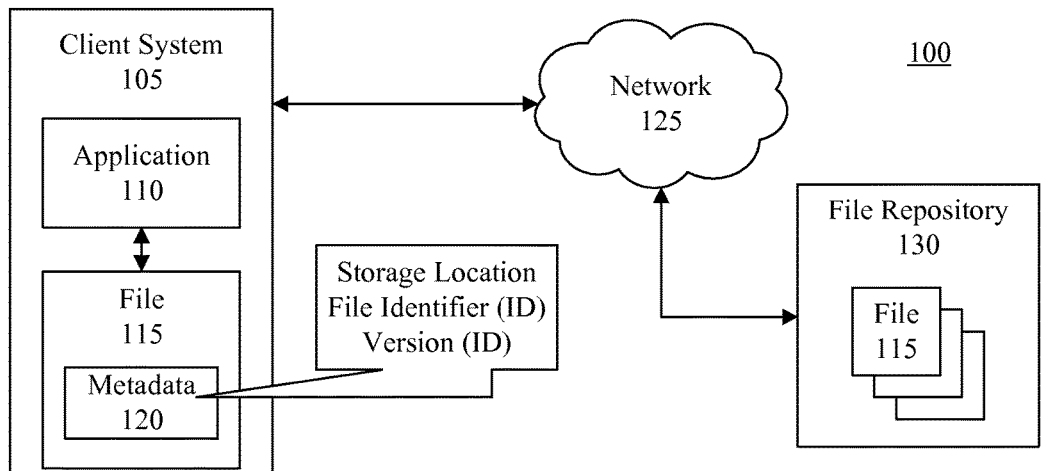
FIG. 1 is a block diagram illustrating a system for file version verification in accordance with an embodiment disclosed within this specification.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

One or more embodiments disclosed within this specification relate to file version verification within a computing system and, more particularly, to automatic file version verification. In accordance with one or more embodiments disclosed within this specification, an operation for an electronic file (file) can be detected. Examples of operations can include, but are not limited to, opening the file, attaching the file to an electronic message, forwarding an electronic message having the file attached thereto, or the like. Responsive to the operation, metadata within the file can be accessed. The metadata within the file can specify a storage location for a master version of the file.

An application, for example, the application that is performing the operation, can determine whether a more recent or up-to-date version of the file exists at the storage location specified within the metadata within the file. The file can be replaced with a more recent version of the file when one is found to be available. In one aspect, permission of the user can be obtained before replacing an outdated file with a more recent version of the file. Because the metadata is incorporated within the file itself, client systems can be configured to perform automated version checks upon the file. The metadata facilitates a lightweight implementation for the automatic file versioning described within this specification.

FIG. 1 is a block diagram illustrating a system 100 for file version verification in accordance with an embodiment disclosed within this specification. System 100 can include a client system 105. Client system 105 can be coupled, e.g., communicatively linked, with a network 125. A file repository 130 can be coupled, e.g., communicatively linked, with network 125. Accordingly, client system 105 and file repository 130 can communicate with one another over network 125.

Client system 105 can be implemented as a data processing system. As such, client system 105 can include, or execute, an application 110. Application 110 can perform one or more operations upon, or using, file 115. In one example, application 110 can be an editor application such as a word processor, a spreadsheet application, a presentation application, or other application that typically is considered part of an office productivity suite. In another example, application 110 can be a communication application configured to send and receive electronic messages such as electronic mail messages. In any case, file 115 can be any of a variety of different types of files upon which application 110 can operate.

As shown, file 115 can be configured to include metadata 120. Metadata 120 can be incorporated within, e.g., be part of, file 115. Metadata 120, in general, includes descriptive information about file 115, but is not considered part of the actual content of file 115. In one aspect, metadata 120 can include a storage location, a file identifier (ID), and a version ID. It should be appreciated that metadata 120 can include one or more additional parameters relating to, or describing, file 115.

The storage location can specify the location from which a master version of file 115 can be stored. In this example, the master version of file 115 can be stored or located within file repository 130. Accordingly, the storage location can specify a location within file repository 130 at which the master version of file 115 is stored. For example, the storage location can be specified in the form of a path, a uniform resource identifier (URI), a uniform resource locator (URL), or the like. The storage location effectively "points" to the master version of file 115 within file repository 130.

The file ID can correspond to, and uniquely identify, each of the versions of file 115. For example, as additional versions of file 115 are generated and stored within file repository 130, the file ID for each version of file 115 is the same. Accordingly, each file having the same file ID can be identified or determined to be, a different version of a same file. The version ID of a file, as the name suggests, differentiates each version of a file from each other version of the same file. In this regard, the version ID of a file can uniquely identify a particular version of a file and, therefore, distinguish that version of the file from two or more other, different versions of the file.

In illustration, two files that have a same file ID can be identified by client system 105 as being different versions of a same file. The two files will have different version IDs. The version ID of the file can indicate the age of the file with respect to each other version of the same file thereby allowing the different versions of a file to be ordered chronologically. For example, newer versions of a file such as file 115 can be distinguished from older versions of the same file using the version ID of the file.

File repository 130 can be implemented as a server or data storage node that can provide centrally located or accessible storage for one or more files. In one aspect, file repository 130 can be remotely located from client system 105. As noted, file repository 130 can be used to store the "master" version of a file or each of a plurality of files. Users can check out files or download files from file repository 130 as needed. For purposes of illustration, file repository 130 is shown to include the master version of file 115. Client system 105 can query file repository 130 through network 125 to request files, receive files, and to check the status of a particular file or version of a file as the case may be.

In operation, client system 105 can download a version of a file, e.g., file 115, from file repository 130. For example, client system 105 can download the most recent version of file 115 that is available as of the time file 115 is downloaded. The most recent version of a file can be determined from a review of the version ID of each file. In one aspect, for example, the version ID can be specified in the form of a timestamp. Accordingly, the most recent version of a file will be the file having the most recent time stamp. For purposes of description, the master version of a file refers to the file having the most recent time stamp. In this regard, the master version of a file can change as newer versions are uploaded back to file repository 130 over time.

Prior to the time application 110 initiates an operation on file 115, another user can upload or store another version of file 115 within file repository 130. The newly uploaded version of file 115 becomes the new master version of file 115 and is, therefore, a newer version of file 115 than was downloaded and stored within client system 105. In response to initiation of an operation on file 115, client system 105, under control of application 110, can be configured to detect metadata 120 within file 115. Client system 105 can access file repository 130 via network 125 using the storage location specified within metadata 120 of file 115.

In this example, network 125 can represent the Internet. It should be appreciated, however, that network 125 can represent, or include, one or more LANs, WANs, wireless networks, mobile networks, or the like. In accessing file repository 130, client system can determine whether a version of file 115 exists within file repository 130 that is newer than the version of file 115 previously downloaded to client system 105. For example, client system 105 can determine whether a new master version of file 115 exists. If so, client system 105 can automatically download the newer version of file 115 and replace the prior downloaded version of file 115 with the newly downloaded and more recent version of file 115.

Figure 2:
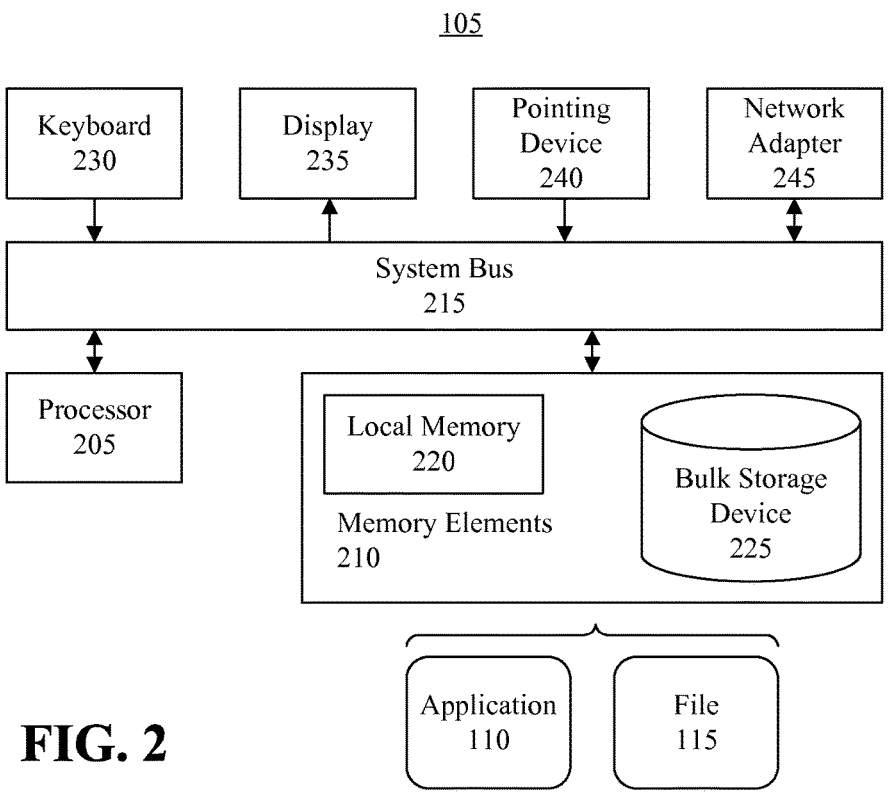
FIG. 2 is a block diagram illustrating a client system described with reference to FIG. 1 in accordance with another embodiment disclosed within this specification.

FIG. 2 is a block diagram illustrating client system 105 of FIG. 1 in accordance with another embodiment disclosed within this specification. Like numbers will be used to refer to the same items throughout this specification. As shown, client system 105 can include at least one processor 205 coupled to memory elements 210 through a system bus 215. Accordingly, client system 105 can store program code within memory elements 210. Processor 205 can execute the program code accessed from memory elements 210 via system bus 215.

In one aspect, for example, client system 105 can be implemented as a computer that is suitable for storing and/or executing program code. It should be appreciated, however, that client system 105 can be implemented in the form of any system that includes a processor and memory that is capable of performing the functions described within this specification. For example, client system 105 can be implemented in the form of a portable computer, a tablet computer, a mobile communication device, or the like in any of a variety of different form factors.

Memory elements 210 can include one or more physical memory devices such as, for example, local memory 220 and one or more bulk storage devices 225. Local memory 220 refers to random access memory or other non-persistent memory device(s) generally used during actual execution of the program code. Bulk storage device(s) 225 can be implemented as a hard drive, solid state drive, or other persistent data storage device. Client system 105 also can include one or more cache memories (not shown) that provide temporary storage of at least some program code in order to reduce the number of times program code must be retrieved from bulk storage device 225 during execution.

Input/output (I/O) devices such as a keyboard 230, a display 235, and a pointing device 240, e.g., a mouse, optionally can be coupled to client system 105. In another aspect, display 235 can be implemented as a touch sensitive display capable of receiving user input. The I/O devices can be coupled to client system 105 either directly or through intervening I/O controllers. A network adapter 245 also can be coupled to client system 105 to enable client system 105 to become coupled to other systems, computer systems, remote printers, and/or remote storage devices such as file repository 130 through intervening private or public networks, e.g., network 125. Modems, cable modems, and Ethernet cards are examples of different types of network adapter 245 that can be used with system 105.

As pictured in FIG. 2, memory elements 210 can store application 110 and file 115. Application 110 can be implemented in the form of executable program code and, as such, can be executed by client system 105 and, more particularly, by processor 205, to implement the various functions and/or operations described within this specification.

In one aspect, a variety of different types of operations can trigger or initiate the various functions and/or operations described within this specification. The type of operation that can be used as a trigger can vary according to the type of application implemented. In one example, application 110 can be implemented as any of a variety of different applications, e.g., file editor applications, that can open a file such as file 115. In that case, the operation that can trigger the functions and/or operations described within this specification can include an access to file 115 such as a file open operation or the initiation of a file open operation upon file 115.

In another example, application 110 can be implemented as a messaging application, e.g., an electronic mail application. In that case, client system 105 can implement a messaging client. The operation that can trigger the functions and/or operations described within this specification can include attaching file 115 to another electronic document or message such as an electronic mail message. Continuing with the messaging client example, one or more other operations relating to an electronic mail message after file 115 is initially associated with the electronic mail message as an attachment such as forwarding the electronic message to which file 115 is attached can be considered an operation that can trigger the functions and/or operations described within this specification.

Figure 3:
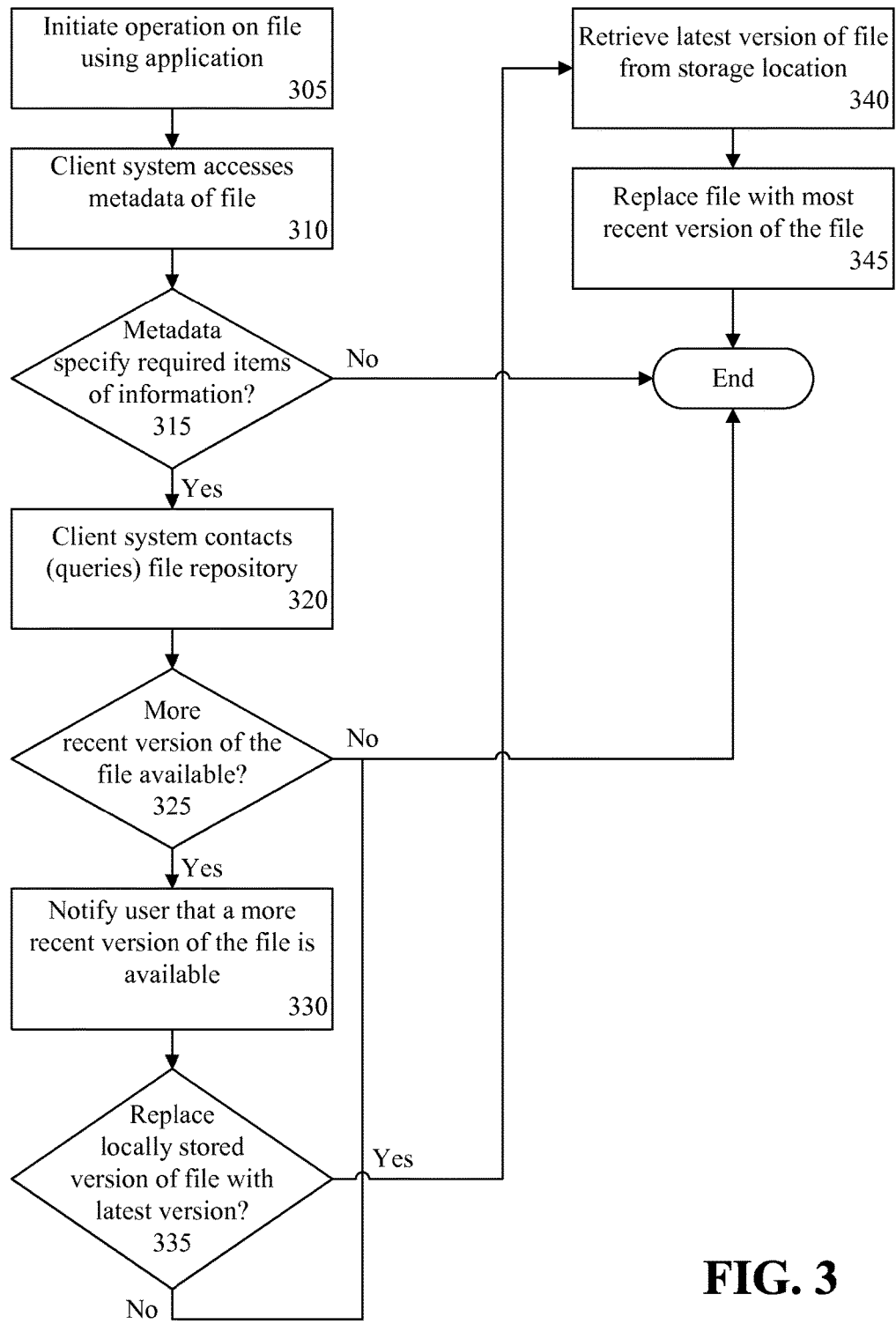
FIG. 3 is a flow chart illustrating a method of file version verification in accordance with another embodiment disclosed within this specification.

FIG. 3 is a flow chart illustrating a method 300 of file version verification in accordance with another embodiment disclosed within this specification. Method 300 can be implemented by a system such as the client system described with reference to FIGS. 1 and 2 of this specification.

Method 300 can begin in step 305 where the application executing within the client system can initiate an operation on the file, e.g., a file that has been downloaded from a file repository. In one aspect, the operation can be a file open operation. For example, the application can be implemented as an editor application that is initiating a file open operation to open the file previously downloaded from the file repository that is stored within the client system.

In another aspect, the application can be a messaging application. In that case, the operation can be a file attachment operation. The messaging application can initiate a file attachment operation upon the file that has been downloaded from the file repository and is stored within the client system. The attach file operation can be initiated to attach the file to an electronic document such as another file, an electronic mail message, an electronic multimedia message, or the like. It should be appreciated that in either the case of a file open operation or a file attachment operation, the file is identified to the client system through one or more user inputs, whether through a file selection interface or via some other means, e.g., drag and drop.

In another aspect, the operation can be a message forward operation. For example, referring again to the case in which the application is a messaging application, when the client system receives a user input requesting that a selected electronic message be forwarded, the client system can determine whether the selected electronic message has a file attached thereto. If so, the client system can perform the file verification functions described within this specification. If not, the client system can perform a conventional forward operation for the selected electronic message.

In step 310, the application can be configured to access metadata of the file. In one aspect, the application can analyze the metadata to determine whether the metadata within the file includes one or more particular items of information such as, for example, a storage location of the master version of the file, a file ID, and/or a version ID. Accordingly, in step 315, the application can determine whether the metadata includes one or more or all of the items of metadata noted. Responsive to determining that one or more required items of information are not present within the metadata as determined from the analysis of the metadata, method 300 can end. Responsive to determining that one or more required items of information are present within the metadata, method 300 can proceed to step 320.

In step 320, the client system, for example, operating under the control of the application, can contact the file repository and, more particularly, the storage location specified within the metadata. For example, the client system can query the file repository to determine whether a newer version of the file exists. In one aspect, the query from the client system can specify the storage location and the file ID. The file repository can respond with the version ID of the master version of the file stored at the specified storage location and having the file ID specified in the query from the client system.

Proceeding to step 325, the client system can determine whether a more recent version of the file exists in the file repository. More particularly, the client system can determine whether the master version of the file stored within the file repository is newer than the file upon which the operation of step 305 is initiated. For example, in response to the query from the client system, the file repository can provide the version ID of the master version of the file stored therein. The client system can compare the version ID of the file currently stored locally within the client system with the version ID received from the file repository received in response to the query.

Responsive to determining that the version ID received from the file repository in answer to the client system query is newer than the version ID of the locally stored file, the client system can determine that a more recent or newer version of the file exists within the file repository. Accordingly, method 300 can proceed to step 330. It should be appreciated that the client system need only determine whether the version ID of the master version of the file differs from the version ID of the file stored locally within the client system. Since only newer versions of the file become the master file, a version ID of the master file that differs from the version ID of the locally stored file can be presumed to be newer.

Responsive to determining that the version ID received from the file repository in answer to the client system query is the same as the version ID of the file stored locally, the client system can determine that the locally stored version of the file is the same as the master version of the file stored within the file repository. In that case, method 300 can end. Accordingly, the operation initiated in step 305 can continue as would be the case in a conventional client system.

Continuing with step 330, the user optionally can be notified that a more recent version of the file upon which the operation initiated in step 305 is available. For example, the client system can present the user with a visual message or cue, an audible message or queue, or the like, informing the user that a more recent version of the file stored locally and previously downloaded from the file repository is available. The client system can present the user with options such as continue using the locally stored version of the file or replace the locally stored version of the file with the newer master version of the file from the file repository. The user can provide an input in response to the notification provided by the client system.

In step 335, the client system can determine whether the locally stored version of the file is to be replaced. Responsive to determining that the locally stored version of the file is to be replaced, method 300 can proceed to step 340. Responsive to determining that the locally stored version of the file is not to be replaced, method 300 can end. Accordingly, the client system can continue with the operation initiated in step 305 in accordance with conventional techniques.

In step 340, the client system can retrieve the latest version of the file from the storage location specified in the metadata of the locally stored file. For example, the client system can download the current master version of the file from the file repository. The latest version of the file downloaded from the file repository can be stored locally on the client system. In one aspect, the master version of the file that was downloaded can be stored by the client system to overwrite the locally stored version of the file, e.g., the older version of the file. In another aspect, the client system can store both versions of the file.

In any case, in step 345, the client system can use the newly downloaded master version of the file in implementing the operation initiated in step 305 in lieu of the file previously stored within the client system. For example, the client system can replace the file with the most recent version of the file, i.e., the newly downloaded master version of the file.

In illustration, in the case where the application is an editor that is opening the file, the downloaded master version of the file can be opened in lieu of any other versions of the file that may have been, or are, stored on the client system. In another example, where the application is a messaging application, and the operation is an attachment operation, the application can attach the newly downloaded master version of the file, e.g., the most recent version of the file, to the electronic message in lieu of any other version(s) of the file that may be stored on the client system. In still another example, where the operation is a forward of an electronic mail to which the file is attached, the file that is currently associated with the electronic message as an attachment can be removed so that the file is no longer attached to the electronic message. The newly downloaded master version of the file can be associated with electronic message as the attachment. The replacement of the file with the current master version of the file can be performed prior to the electronic mail message forwarding the electronic mail. In this regard, the propagation of out of date files can be substantially curtailed.

The one or more embodiments disclosed within this specification provide various techniques that prevent the propagation of out of date or potentially obsolete files among users. Responsive to the initiation of one or more selected types of operations upon or involving a file, the client system can be configured to check a designated location for a more recent version of the file. The location that is checked or queried can be specified within the metadata of the file itself. The older version of the file that is stored locally on the client system can be replaced with the newly downloaded master version of the file from the file repository.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A computer-implemented method performed within a client computer system, comprising:
    initiating a first operation using a file stored within the client computer system;
    performing, responsive to the initiating, a file version verification operation including:
        obtaining, from within the file, metadata including a version identifier and a storage location that specifies a particular location within a file repository in which a master version of the file is stored,
        identifying, using the storage location, the file repository located external to the client computer system that includes the master version of the file,
        determining, by the client computer system, that the master version of the file is more recent than the file stored within the client computer system, and
        downloading, to the client computer system and based upon the determining, the master version of the file; and
    resuming, after the downloading, the first operation using the downloaded master version of the file.

2. The method of claim 1, wherein
the master version of the file is used during the operation.

3. The method of claim 1, wherein
the operation is attaching the file to an electronic message.

4. The method of claim 1, wherein
the operation is forwarding an electronic messages that includes the file as an attachment.

5. The method of claim 1, wherein
the operation is opening the file within an application.

6. The method of claim 1, wherein
the determining includes comparing a version number of the file with a version identifier of the master version of the file.

7. A client computer system, comprising:
a hardware processor configured to initiate the following executable actions:
    initiating a first operation using a file stored within the client computer system;
    performing, responsive to the initiating, a file version verification operation including:
        obtaining, from within the file, metadata including a version identifier and a storage location that specifies a particular location within a file repository in which a master version of the file is stored,
        identifying, using the storage location, the file repository located external to the client computer system that includes the master version of the file,
        determining, by the client computer system, that the master version of the file is more recent than the file stored within the client computer system, and
        downloading, to the client computer system and based upon the determining, the master version of the file; and
    resuming, after the downloading, the first operation using the downloaded master version of the file.

8. The client computer system of claim 7, wherein
the master version of the file is used during the operation.

9. The client computer system of claim 7, wherein
the operation is attaching the file to an electronic message.

10. The client computer system of claim 7, wherein
the operation is forwarding an electronic messages that includes the file as an attachment.

11. The client computer system of claim 7, wherein
the operation is opening the file within an application.

12. The client computer system of claim 7, wherein
the determining includes comparing a version number of the file with a version identifier of the master version of the file.

13. A computer program product, comprising:
a hardware storage device having stored therein computer readable program code,
the computer readable program code, which when executed by a client computer system, causes the client computer system to perform:

initiating a first operation using a file stored within the client computer system;

performing, responsive to the initiating, a file version verification operation including:

obtaining, from within the file, metadata including a version identifier and a storage location that specifies a particular location within a file repository in which a master version of the file is stored, identifying, using the storage location, the file repository located external to the client computer system that includes the master version of the file, determining, by the client computer system, that the master version of the file is more recent than the file stored within the client computer system, and downloading, to the client computer system and based upon the determining, the master version of the file; and resuming, after the downloading, the first operation using the downloaded master version of the file.

14. The computer program product of claim 13, wherein the master version of the file is used during the operation.

15. The computer program product of claim 13, wherein the operation is attaching the file to an electronic message.

16. The computer program product of claim 13, wherein the operation is forwarding an electronic messages that includes the file as an attachment.

17. The computer program product of claim 13, wherein the operation is opening the file within an application.

18. The computer program product of claim 13, wherein the determining includes comparing a version number of the file with a version identifier of the master version of the file.

\* \* \* \* \*